June 7, 1966  E. F. BAEHR  3,254,395
METHOD OF MAKING A ROCKET MOTOR CASING
Filed Jan. 4, 1963  2 Sheets-Sheet 2
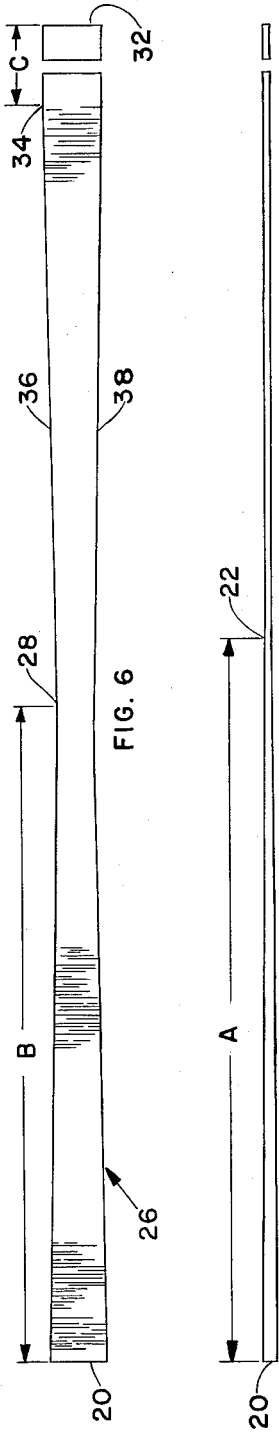
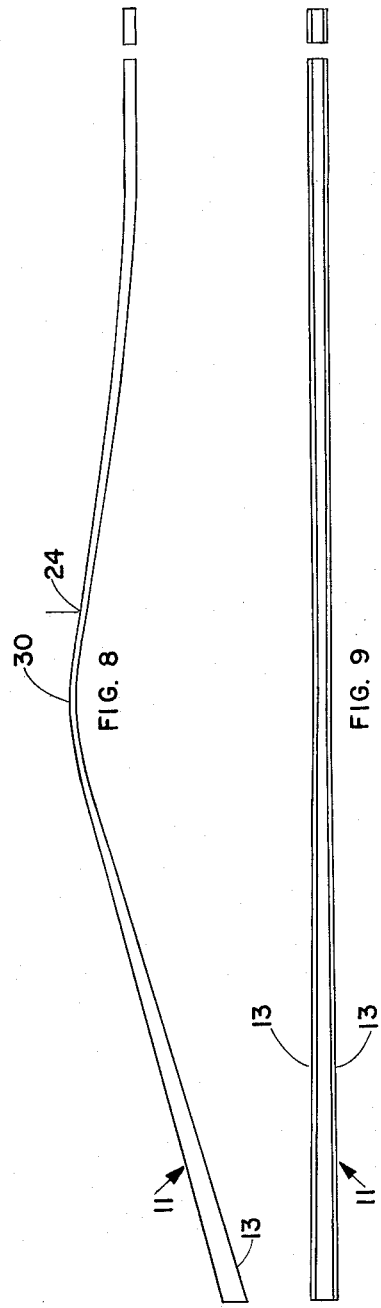
INVENTOR
EDWARD F. BAEHR
BY
ATTORNEYS United States Patent Office 3,254,395
Patented June 7, 1966

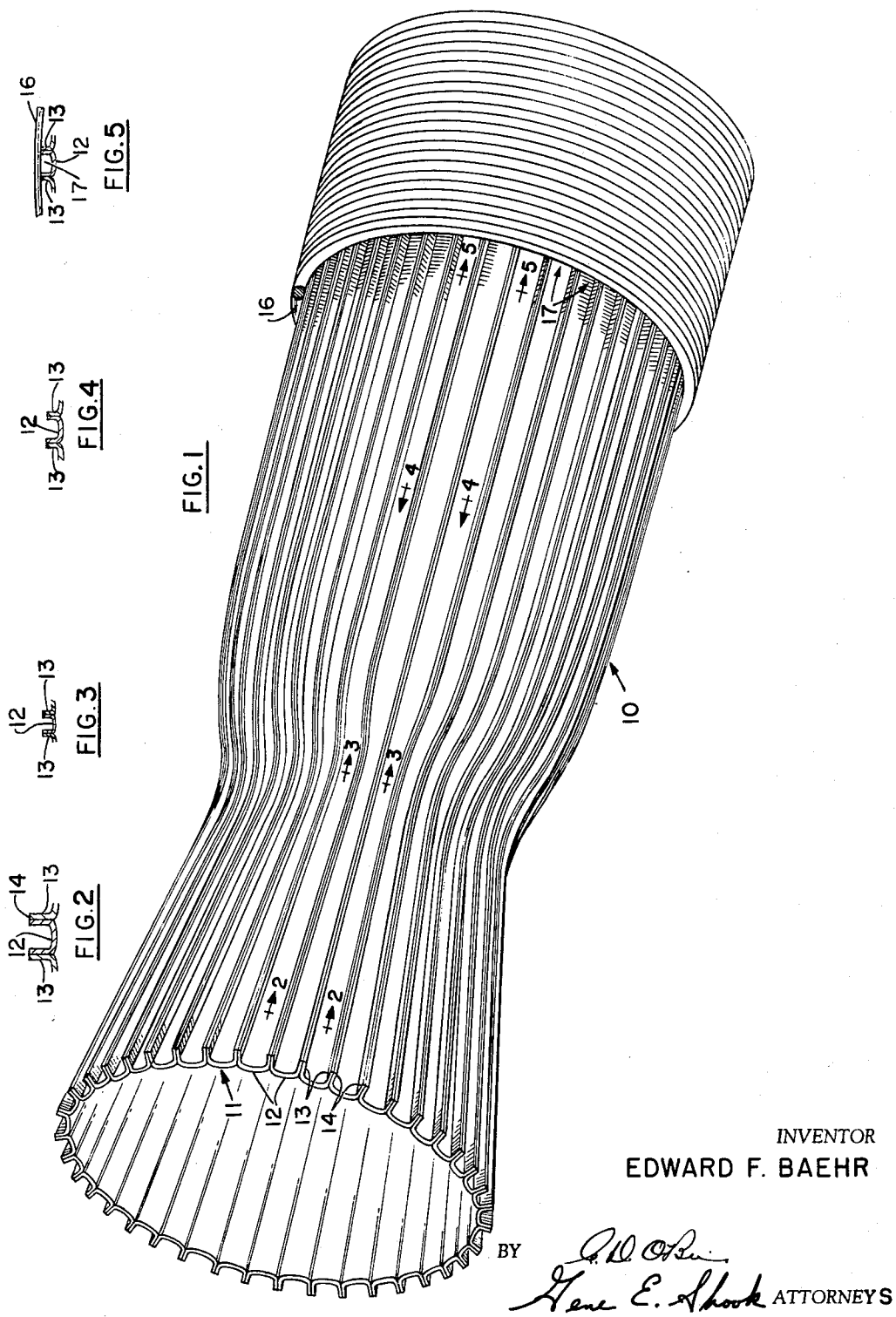

3,254,395
METHOD OF MAKING A ROCKET
MOTOR CASING
Edward F. Baehr, Berea, Ohio, assignor to the United States of America as represented by the Administrator of the National Aeronautics and Space Administration
Filed Jan. 4, 1963, Ser. No. 249,539
4 Claims. (Cl. 29—157)

The invention described herein may be manufactured and used by or for the Government of the United States of America for governmental purposes without the payment of any royalties thereon or therefor.

The present invention relates to an improved regeneratively cooled rocket motor casing that comprises a plurality of channels in engagement with one another and a method of making such a rocket motor casing wherein each channel is tapered to provide a thickness at each cross-section that meets the necessary strength requirements without excessive weight.

This invention is an improvement of the structure shown in the United States Patent No. 2,943,442 relating to a regeneratively cooled rocket motor casing. In the structure of this patent, a plurality of channels are secured together to form a hollow elongated enclosure with the channel ribs extending radially outward outward to engage binding means encircling the exterior of the enclosure thereby forming a skin which defines with the channels a series of coolant passages. As pointed out in this patent, it is essential that the wall of such a casing be thin in order to save weight, and this accomplished by uniformly varying the height of the channel ribs at successive longitudinal stations along the nozzle portion of the casing. While the structure disclosed in this patent has proved to be satisfactory, each channel has a uniform thickness throughout its entire length which results in excessive wall strength in certain areas.

The present invention provides a minimum thickness at each channel cross-section that is consistent with the local channel span and differential pressure load. This accomplished by utilizing a sheet of stock having a tappered thickness in certain areas, and removing a plurality pattern outlined blanks from this sheet. The blanks are then bent to form channels having webs and ribs of varying thicknesses.

It is, therefore, an object of the present invention to provide an improved rocket motor casing utilizing tapered channels which insure minimum thicknesses at each channel cross-section that meet the strength requirements established by local channel spans and differential pressure loads.

Another object of the invention is to provide an inexpensive method for producing channels having variations in wall thickness within required tolerances to meet local thickness requirements determined by local load requirements.

Another object of the invention is to provide a tapered channel in which the taper extends across the rolling direction of the stock so that the longitudinal properties of the channel material can be utilized to withstand the principle stresses in the final use.

Other objects and advantages of the invention will be apparent from the specification which follows and from the drawings in which like numerals are used throughout to identify like parts.

In the drawings:

FIG. 1 is an isometric view of a rocket motor casing showing the assembly at that fabrication stage preparatory to forming the outer closure for the coolant passages;

FIGS. 2, 3, 4 and 5 are enlarged sectional views taken along the lines 2—2, 3—3, 4—4 and 5—5 in FIG. 1 showing the variations in the heights and thicknesses of the channels along the length of the casing.

FIG. 6 is a plan view of a blank used to form one of the channels after it has been removed from a sheet of tapered stock and cut to the required outline;

FIG. 7 is a side elevation view of the blank shown in FIG. 6 showing the portion of the stock having a varying thickness and the portion having a uniform thickness;

FIG. 8 is a side elevation view of a typical channel that is bent from the blank shown in FIGS. 6 and 7 and contoured to the desired profile of a section through the combustion chamber and nozzle of the rocket motor casing shown in FIG. 1; and FIG. 9 is a plan view of the contoured channel shown in FIG. 8.

Referring now to the drawings, there is shown in FIG. 1 a preferred embodiment of a rocket motor casing 10 fabricated from a plurality of channels 11 formed from a material capable of withstanding the operating temperatures as well as the corrosive action of the propellants. The channels 11 have webs 12 and ribs 13 of varying lengths and thicknesses at the longitudinal stations indicated in FIG. 1 and shown in detail in FIGS. 2 through 5. These channels are joined together by a brazing material 14 interposed between the contiguous ribs 13 of adjacent channels during the fabrication process.

In high temperature installations, high strength wire 16 is wrapped about the assembled channels 11 to form a non-porous outer skin and is brazed to the ribs 13 at the points of contact therewith. Contoured metal ribbon may be used instead of the wire 16 to form the outer casing. By this expedient, the channels 11 are readily converted into conduits which form coolant passages 17 having variable cross-sectional areas because the height of the channel ribs 13 is varied as shown in FIG. 1. In this manner the propellant coolant is provided with the proper design velocity to accomplish the required cooling rates.

In order to fabricate the rocket motor casing 10, a uniformly thick sheet of standard rolled stock of the material for the channels 11 has its thickness altered to that shown in FIG. 7 by taper rolling, contour grinding, or chemical milling. This tapers the thickness of a portion A of the sheet which extends inwardly from an outer edge 20 to a centrally disposed station 22. The thickness variation of the tapered portion A is a simple slope for the nozzle contour shown in FIG. 1 which extends across the direction of rolling of the sheet stock so that the longitudinal properties of the material will be utilized to withstand the principle stresses in the rocket motor casing 10. The thickness is the greatest at the edge 20 and the least at the station 22 which corresponds to the point of tangency 24 between the convergent portion and the throat portion of the nozzle as shown in FIG. 8. For nozzles having a different configuration, the optimum local thickness would vary according to the stresses.

While the thickness of the tapered portion A is varied, the remainder of the sheet comprising that portion to the right of the station 22 in FIG. 7 which is ultimately adjacent the convergent portion of the nozzle and combustion chamber has its thickness reduced a uniform amount to provide a portion of constant thickness. In a typical rocket motor casing 10 the sheet of stock was uniformly tapered from a thickness of 0.018 inch at the edge 20 to a thickness of 0.004 inch at the station 22 while the thickness of the remainder of the sheet was likewise reduced to 0.004 inch. For a combustion chamber and convergent portion of the nozzle having a different contour the optimum local thickness would vary according to the stresses.

Subsequent to the thickness tapering operation, the sheet of stock is divided into a plurality of blanks 26 having a pattern outline that is determined by the local width and height requirements. Each blank 26 has a region B which extends inwardly from the edge 20 to a centrally disposed area 28 shown in FIG. 6 which corresponds to the area 30 of minimum diameter in the throat of the nozzle as indicated in FIG. 8.

Referring again to FIG. 6, the width of the blank 26 in the region B diminishes from a maximum at the edge 20 to the station 28 while the thickness likewise diminishes as is seen in FIG. 7. The pattern outlined blank 26 further has a region C which extends inwardly from the opposite edge 32 toward the centrally disposed area 28 and terminates at a tangent point 34 which corresponds to the point of tangency between the convergent portion of the nozzle and the cylindrical portion of the combustion chamber. The width of the blank 26 is constant in the region C as is shown in FIG. 6 while the thickness of this region is likewise constant. The width tapers uniformly from the tangent point 34 to the centrally disposed area 28 while the thickness remains constant to the point 22 as previously described. It will be appreciated that other combustion chamber and nozzle contours will require other specific blank outlines and thicknesses to meet local width and heighth requirements together with local stresses.

Opposed marginal edge portions 36 and 38 shown in FIG. 6 of each blank 26 are bent to form the ribs 13 shown in FIGS. 8 and 9 of each channel 11. This bending also produces a slight curvature in the webs 12 which likewise vary in width as well as thickness as shown in FIGS. 1 through 5. This semi-elliptical curvature of the web 12 accommodates high internal pressures. Also, the resulting ribs 13 have varying heights and thicknesses as illustrated in FIGS. 8 and 9. In the aforementioned typical rocket motor casing, each channel 11 has a width of 0.165 inch at the outermost edge 20 which tapered inwardly to 0.085 inch at its narrowest portion adjacent the centrally disposed area 28 and tapered outwardly to a value of 0.118 inch adjacent the cylindrical portion of the combustion chamber.

Each tapered channel produced by the formed blank is simultaneously contoured to the profile of a section through the rocket motor casing 10 as illustrated in FIG. 8. The contoured channels are assembled in abutting relationship to form the nozzle and combustion chamber. The channels 11 are then spotwelded together or similarly joined, and subsequently the brazing material 14 is introduced between the ribs 13 of adjacent channels. Thereupon the channels 11 are brazed into the assembly forming the rocket motor casing 10 shown in FIG. 1. The channel assembly 10 is wire wrapped, and the wire 16 is brazed to the ribs 13 as well as the adjacent turns thereby forming a plurality of longitudinally extending passages for regenerative cooling.

While a preferred embodiment of the invention has been shown and described, it will be apparent that various modifications can be made to the disclosed rocket motor casing and its method of fabrication without departing from the spirit of the invention or the scope of the subjoined claims. For example, it is contemplated that constant thickness channels may be used wherein the desired thickness variation is provided by grinding or chemi-milling only the heat transfer surface. Although this is more costly, it provides heavier and stronger channel ribs for brazing to the rib wrap 16.

What is claimed is:
1. A method of making a rocket motor casing comprising the steps of:
   tapering the thickness of a portion of a substantially flat sheet of stock which extends inwardly from one sheet edge to a centrally disposed area of said sheet while maintaining the remainder of said sheet at a substantially constant thickness,
   dividing said sheet of stock into a plurality of blanks, each having a region of diminishing width which extends from said one sheet edge to said centrally disposed area,
   bending opposed marginal edge portions of said blanks to form a plurality of tapered channels with upwardly extending ribs connected by webs,
   contouring said bent blanks to the profile of a section through the rocket motor casing,
   assembling said contoured channels in abutting relationship with said upwardly extending ribs in contact with the ribs of adjacent channels to form a nozzle and combustion chamber with said webs constituting an inner surface thereof,
   bonding said contacting ribs to one another, and
   wrapping a flexible closure member about said assembly to form a plurality of longitudinally extending passages for regenerative cooling.

2. A method of making a rocket motor casing comprising the steps of:
   taper rolling a substantially flat sheet of stock to taper the thickness of a portion thereof which extends inwardly from one sheet edge to a centrally disposed area of said sheet while maintaining the remainder of said sheet at a substantially constant thickness,
   dividing said sheet of taper rolled stock into a plurality of pattern outlined blanks, each having one region of tapered thickness extending from said one sheet edge across the direction of taper rolling to a central portion and another region of constant thickness extending from the opposite sheet edge to said one region,
   bending opposed marginal edge portions of said pattern outlined blanks to form a plurality of channels having upwardly extending ribs of varying heights and thicknesses connected by webs of varying widths and thicknesses,
   contouring said channels to the profile of a section through the nozzle and the combustion chamber of said rocket motor casing,
   bonding said ribs to one another with said webs constituting the inner surface of the wall of said rocket motor casing, and
   wrapping the contoured tapered channels to form a plurality of longitudinally extending passages for regenerative cooling.

3. A method of making a rocket motor casing comprising the steps of:
   contour grinding a substantially flat sheet of stock to taper the thickness of a portion thereof which extends inwardly from one sheet edge to a centrally disposed area of said sheet while maintaining the remainder of said sheet at a substantially constant thickness,
   separating a plurality of blanks from said sheet of contour ground stock each having a first region of diminishing width and thickness extending from said one sheet edge toward a central portion and a second region of constant width and thickness extending from the opposite sheet edge toward said central portion,
   bending opposed marginal edge portions of said blanks to form a plurality of tapered channels having upwardly extending ribs of varying heighths and thickness in said first region and constant heighths and thickness in said second region,
   contouring said tapered channels to the profile of a section through the nozzle and the combustion chamber of said rocket motor casing,
   bonding said ribs to one another, and
   wrapping the assembled channels with a flexible closure member to form a plurality of longitudinally extending passages for regenerative cooling.

4. A method of making a rocket motor casing comprising the steps of:
   chemical milling a substantially flat sheet of stock to taper the thickness of a portion thereof which extends inwardly from one sheet edge to a centrally disposed area of said sheet while maintaining the remainder of said sheet at a substantially constant thickness, dividing said sheet of chemically milled stock into a plurality of pattern outlined blanks, each having one region of diminishing width which extends from said one sheet edge toward a central portion and a second region of constant width extending from the opposite sheet edge toward said central portion, bending opposed marginal edge portions of said blanks at right angles to the plane of said sheet of stock to form a plurality of tapered channels with opposed upwardly extending ribs, contouring said bent blanks to the profile of a section through the desired rocket motor casing, assembling said contoured channels in abutting relationship with said ribs in contact with the ribs of adjacent channels to form the nozzle and combustion chamber, bonding said contacting ribs to one another, and wrapping said assembly to form a plurality of longitudinally extending passages for regenerative cooling.

References Cited by the Examiner

UNITED STATES PATENTS

| | | | |
|---|---|---|---|
| 2,943,442 | 7/1960 | Baehr | 60—35.6 |
| 2,956,334 | 10/1960 | Stewart | 29—157 |
| 2,976,679 | 3/1961 | Dalgleish | 60—35.6 |
| 3,035,333 | 5/1962 | Baehr | 29—157.3 |

FOREIGN PATENTS 238,643   9/1961   Australia.

JOHN F. CAMPBELL, *Primary Examiner.*

A. BLUM, *Examiner.*

S. N. GARBER, J. D. HOBART, *Assistant Examiners.*